United States Patent [19]
Middour et al.

[11] Patent Number: 6,085,128
[45] Date of Patent: Jul. 4, 2000

[54] ORBIT/COVARIANCE ESTIMATION AND ANALYSIS (OCEAN) DETERMINATION FOR SATELLITES

[75] Inventors: Jay W. Middour; Mark T. Soyka, both of Alexandria; Robert R. Dasenbrock, Falls Church, all of Va.; Peter J. Melvin, Waldorf, Md.; Henry M. Pickard; Patrick W. Binning, both of Alexandria, Va.

[73] Assignee: The United States of America as represented by the Secretary of the Navy, Washington, D.C.

[21] Appl. No.: 09/241,392

[22] Filed: Feb. 2, 1999

Related U.S. Application Data
[60] Provisional application No. 60/073,881, Feb. 6, 1998.

[51] Int. Cl.$^7$ .............................. G01S 5/02; H04B 7/185; B64G 1/10
[52] U.S. Cl. .............................................. 701/13; 701/226
[58] Field of Search .............................. 701/13, 226, 213, 701/214; 342/357, 357.12, 357.13, 357.15

[56] References Cited

U.S. PATENT DOCUMENTS

| | | | |
|---|---|---|---|
| 3,795,911 | 3/1974 | Hammack | 343/9 |
| 4,114,155 | 9/1978 | Raab | 343/105 R |
| 4,667,203 | 5/1987 | Counselman | 342/357 |
| 4,736,247 | 4/1988 | Graham et al. | 348/139 |
| 4,870,422 | 9/1989 | Counselman | 342/357 |
| 4,883,244 | 11/1989 | Challoner et al. | 244/171 |
| 4,912,475 | 3/1990 | Counselman | 342/352 |
| 5,014,066 | 5/1991 | Counselman | 342/352 |
| 5,041,833 | 8/1991 | Weinberg | 342/357 |
| 5,141,308 | 8/1992 | Danckwerth et al. | 356/5.05 |
| 5,363,110 | 11/1994 | Inamiya | 342/357 |
| 5,375,059 | 12/1994 | Kyrtsos et al. | 364/449 |
| 5,430,657 | 7/1995 | Kyrtsos | 364/459 |
| 5,506,780 | 4/1996 | Montenbruck et al. | 701/226 |
| 5,570,096 | 10/1996 | Knight et al. | 342/375 |
| 5,828,336 | 10/1998 | Yunck et al. | 342/357 |

OTHER PUBLICATIONS

SatTrack (V4.0)–a real–time satellite tracking and orbit prediction program; Bester; IEEE; Aerospace Applications Conference, Feb. 3–10, 1996; vol. 4, pp. 177–191.

A new high performance multipurpose satellite tracking system; De Gaudenzi et al.; IEEE; Aerospace and Electronics Systems; Jan. 1993; vol. 29, pp. 27–43.

Soyka et al.; The Naval Research Laboratory's Orbit/Covariance Estimation and Analysis Software: OCEAN; AAS/A1AA Astrodynamics Specialist Conf.; Sun Valley, ID., Paper No. 97–703; Aug. 4–7, 1997.

B.E. Shutz; New Observational Techniques and Precise Orbit Determination of Artificial Satellites; Celestial Mechanics and Dynamical Astronomy vol. 66, pp. 79–85, 1997.

Vol. 1,WSIPOD Systems Description, Yau Martin Systems, Inc., Rockville, MD; pp. 1 thru 25, Aug. 1994.

Tapley et al., Satellite Orbit Determination: Fundamentals and Applications; Ctr. for Space Research, U of Tex., Austin, TX; pp. 1.1–1.2, Jun. 1988.

*Primary Examiner*—Michael J. Zanelli
*Attorney, Agent, or Firm*—Barry A. Edelberg; Charles J. Stockstill

[57] ABSTRACT

The orbit/covariance estimation and analysis (OCEAN) technique utilizes ground station observations collected from satellites passing overhead and estimates the positions, velocities, and other parameters of multiple satellites. It also estimates parameters for other elements, such as the locations of ground stations and measurement biases. The technique utilizes recorded observations (e.g., range, Doppler) and measurements from various sources as inputs to a weighted least squares batch estimation algorithm used in iterative fashion to estimate each parameter, with or without a priori knowledge of the errors involved with each observed parameter. The process is completed once the residual, the difference between the estimated parameter and the observed parameter, satisfies the tolerance defined by the user. Using the results of the estimation process or a pre-defined initial condition file, the OCEAN program can also generate a predicted trajectory (i.e., ephemeris) for the satellite(s) from a specified initial time to a final time. The resulting epheremerides can be output in a predefined file format chosen by the user.

23 Claims, 7 Drawing Sheets

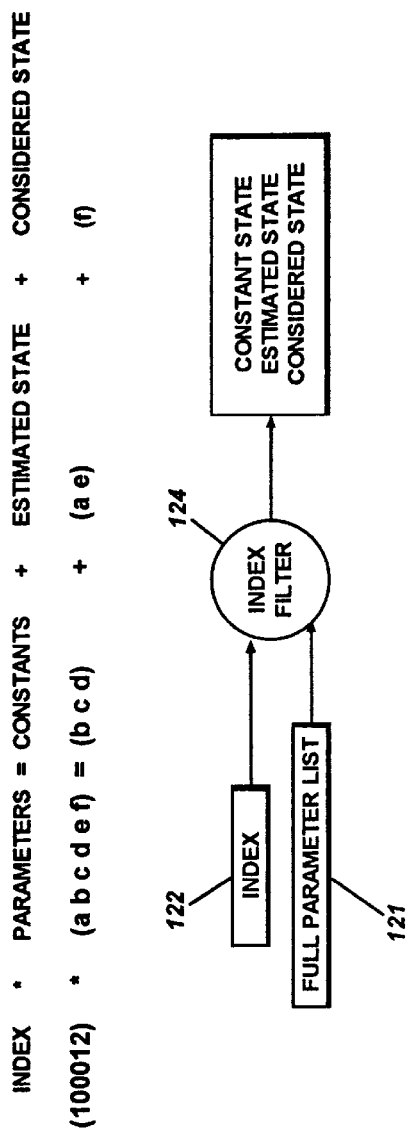
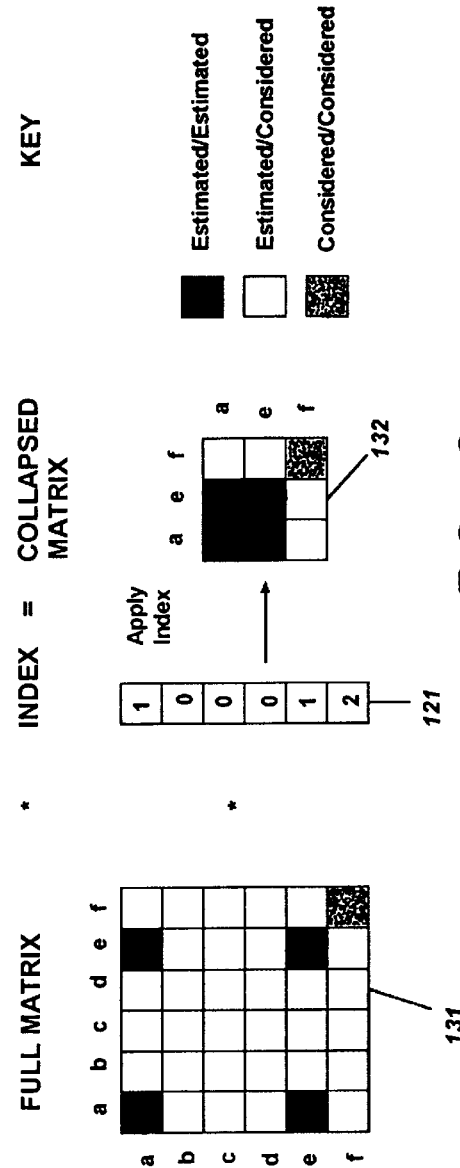

ORBIT/COVARIANCE ESTIMATION AND ANALYSIS (OCEAN) DETERMINATION FOR SATELLITES

CROSS-REFERENCE TO RELATED APPLICATIONS

This application claims the benefit of U.S. Provisional Application Ser. No. 60/073,881, filed on Feb. 6, 1998.

BACKGROUND OF THE INVENTION

1. Field of the Invention

This invention pertains generally to a device and method for determining the position, velocity, and other parameters for a satellite and more specifically to an apparatus and method for determining the positions, velocities and other parameters of a multiple of satellites, or celestial bodies.

2. Description of the Related Prior Art

Highly automated, accurate, and reliable orbit determination processing is required for large scale satellite networks. Reliable automatic processing reduces the cost of operating a satellite network by reducing the need for expert orbit determination.

Several general purpose orbit determination and prediction techniques exist today, however, none of these techniques automatically processes raw tracking data and process as finished orbit products and analyses using Batch Least Squares; simultaneously compute orbits and covariance for complex networks of multiple satellites, using multiple ground stations with various tracking measurement types; computes relative satellite trajectories in which one satellite orbit is determined very accurately with respect to another satellite orbit; identifies calibration anomalies in tracking network components by combining tracking measurements; and incorporates state-of-the-art dynamical models that allow rapid update to newer models when they become available. Because of this the following difficulties arise; in the absence of robust automatic operations, skilled orbit analysts must intervene to cull bad observations by manually examining observation errors; most existing orbit determination techniques are designed to process one satellite at a time, requiring large-scale satellite networks to be processed serially. Relative navigation requirements are typically addressed by custom program techniques on a case-by-case basis. Also, calibration anomalies have typically been identified by a parametric series of orbit determination computations where sets of parameters are held constant or estimated in a brute force attempt to isolate error sources; and the roots of most orbit determination techniques available today can be traced back to the beginning of the space age. The codes within these techniques are often undocumented, hard to read, and harder to update. Large expenditures are often incurred when model updates are required.

SUMMARY OF THE INVENTION

The object of this invention is to provide an apparatus and method for estimating the positions, velocities, and other parameters of one or more satellites and other celestial bodies simultaneously.

These and other objectives are achieved by the orbit/covariance estimation and analysis (OCEAN) which consists of a design of a technique for processing simultaneous orbit determination solutions for a multiple of satellites and implementation of the design in modern, structured FORTRAN computer code. The invention is an effective, and accurate device for orbit determination of larger scale satellite networks. OCEAN utilizes ground station observations collected from satellites passing overhead and estimates the positions, velocities, and other parameters of multiple satellites. Satellite parameters include coefficient of drag, solar radiation reflecting coefficient, orbit decay rate, and timing and frequency biases. Biases are to an output display. It also may be used to estimate parameters for other elements, such as the locations of ground stations and measurement biases. The technique utilizes recorded observations (e.g., range, Doppler) and measurements from various sources as inputs to a weighted least squares batch estimation algorithm used in an iterative fashion to estimate each parameter, with or without a priori knowledge of the errors involved with each observed parameter. The process is completed once the residual, the difference between the estimated parameter and the observed parameter, satisfies the tolerance defined by the user. Using the results of the estimation process or a predefined initial condition file, OCEAN can also generate a predicted trajectory (i.e., ephemeris) for the satellite(s) from a specified initial time to a final time. The resulting ephemerides and complete processing history can be output for display in a predefined file format chosen by the user.

BRIEF DESCRIPTION OF THE DRAWINGS

FIG. 9 shows an index filter application.

FIG. 10 shows collapsing a matrix.

DESCRIPTION OF THE PREFERRED EMBODIMENT

This invention is an Orbit/Covariance Estimation and Analysis (OCEAN) system for estimating the positions, velocities, and other parameters of multiple satellites and celestial bodies. OCEAN consists of a technique for processing simultaneous orbit determination solutions for a multiple satellites within a computer and a prototype implementation of the design in modern, structured FORTRAN® computer code for display on an x-y plotter, visual display, or printer. It may also be used to estimate parameters for other elements, such as the locations of ground stations and measurement biases. The apparatus uses recorded observations (e.g., range, Doppler) and measurements from various sources as inputs to a weighted least squares batch estimation algorithm. The algorithm is used in an iterative fashion to estimate each parameter, with or without a priori knowledge of the errors involved with each observed parameter. The process is completed once the residual, the difference between the estimated parameter and observed parameter, satisfies a tolerance defined by the user. Using the results of the estimation process or a predefined initial condition file, the OCEAN system can also generate a predicted trajectory (i.e., ephemeris) for the satellite(s) from a specified initial time to a final time. The resulting ephemerides are output in a predetermined file format chosen by the user. The apparatus is completely configured using a data base which determines the specific parameters to be used for each new orbit determination problem.

The goal of the batch least squares orbit determination algorithm is to estimate a given state vector at some specified time, which is usually at the beginning or end of a data arc. It is common to include the spacecraft's position and velocity as a part of the state, however, it is also possible to estimate such parameters as ground station locations, measurement model biases, satellite coefficient of drag, etc.

Figure 1:
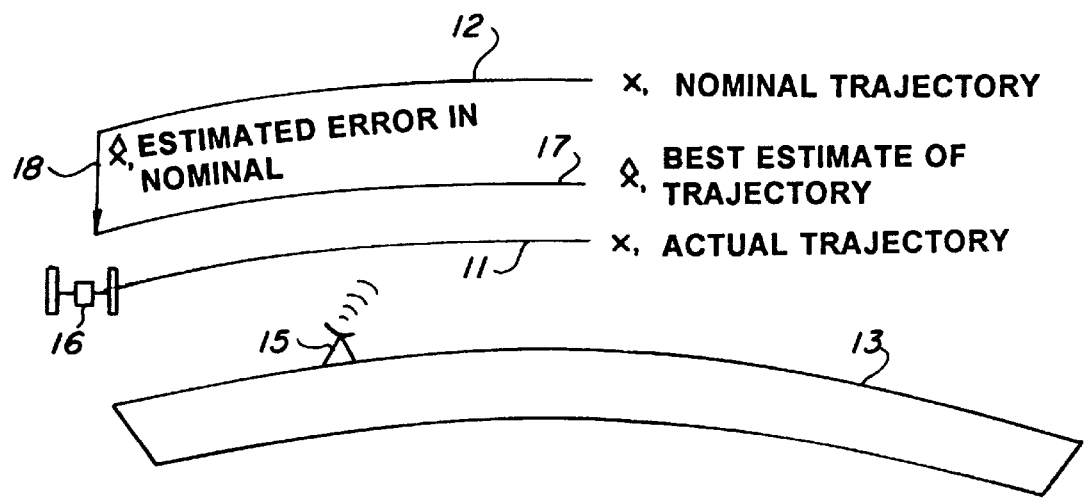
FIG. 1 shows the satellite trajectories necessary to establish the estimated nominal trajectory.

In the OCEAN system, as shown in FIG. 1, the satellite 16 follows an actual trajectory, X, 11; this represents absolute truth, which would be known if the physical world were perfectly modeled. However, only the best possible estimate of trajectory 17 can be determined through orbit determination. This "best" trajectory 17, X, depends upon the exactness of the dynamical model and on the quality of the measurements; (e.g., range, Doppler, etc.). The "best" trajectory 17 is solved for using the orbit determination process. A reference or nominal trajectory X*, must be used as the starting point as the basis of the solution. The batch least squares algorithm estimates the difference between the nominal, X*, and the best estimate trajectories, $\hat{X}$, 12 and 17, respectively. This is also called the estimated error in the nominal trajectory, x, 18.

Therefore, at the initial time, $t_0$, the best estimate is defined as $$\hat{X}_0 = X^*_0 + \hat{x}_0. \tag{1}$$

The estimation process uses the information contained in the measurements, such as range or Doppler shift, as shown in FIG. 1, of a satellite's actual trajectory 11 taken by a ground station 15 to provide an updated trajectory. Each measurement has a sensitivity to the errors in the actual trajectory 11 with respect to an a priori satellite 16 state (position, velocity, typically) at an initial epoch, $t_0$. These sensitivities provide a measure of the statistical error or covariance associated with the best trajectory 17. The sensitivity, or estimate error in nominal trajectory 18, at the time of each Measurement must be mapped, to this initial estimation epoch. The accumulation at $t_0$ of all sensitivities from all measurements along with the accumulation of the residuals between the theoretical and actual measurements allows the error in the state at $t_0$ to be estimated. The equations used in the accumulation and estimation are called the normal equations. If the user specifies a final epoch at which to report the state, then the solved for state must be propagated to this epoch, $t_f$.

The problem of orbit determination and prediction is linearized to simplify the estimation process and the equations involved. One important equation is the observations-state relationship equation. The linearization process and this equation are described below as are the a priori weights and covariances, the linearization of the observation-state relationship, and the state error estimation and update, and, finally the test for convergence.

Notation is important when describing the algorithm. The equations herein follow the following notation shown in Table 1.

Figure 2:
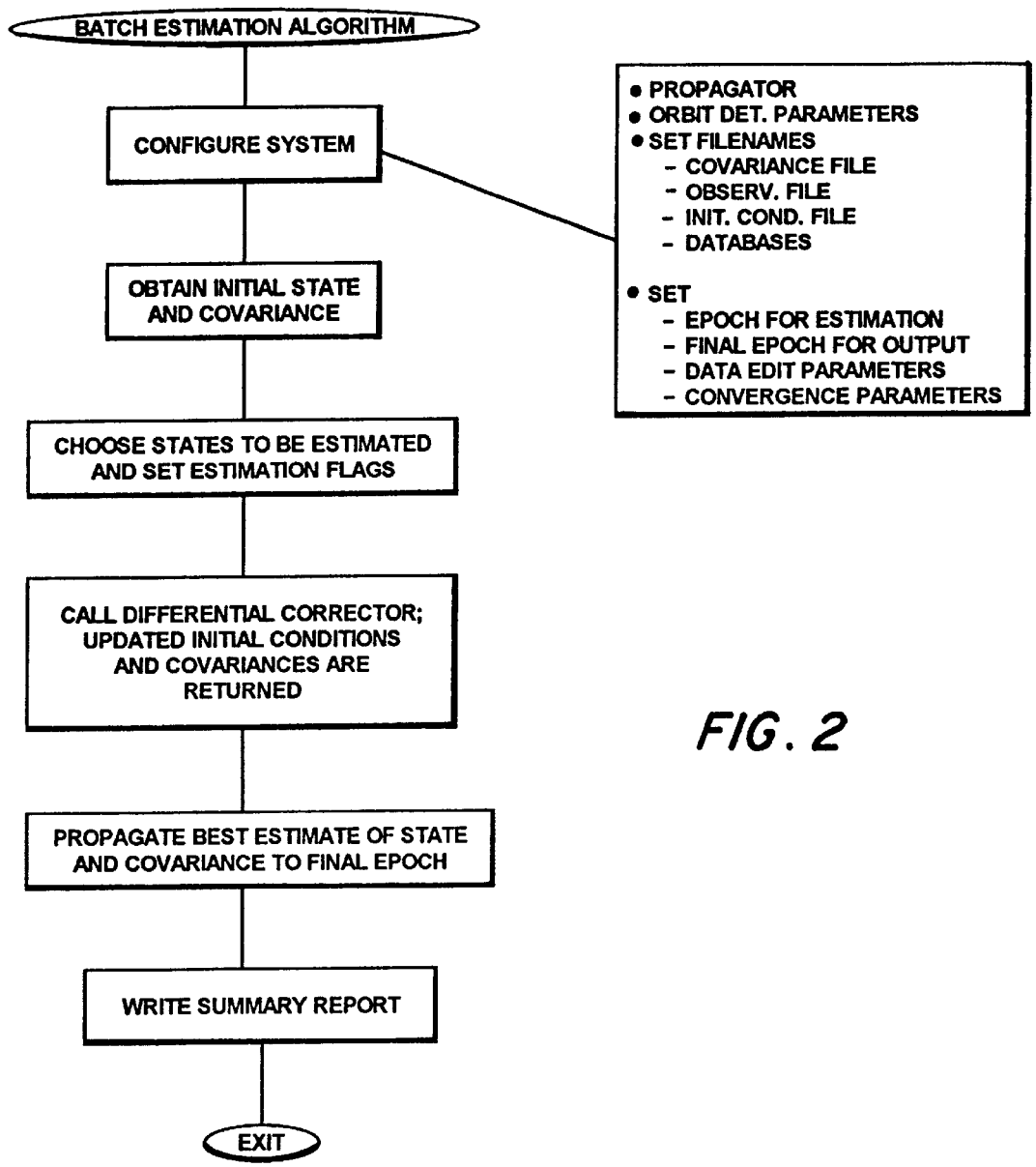
FIG. 2 shows a flowchart summarizing the setup procedure for the batch algorithm.

The estimation algorithm requires the user to follow a setup procedure prior to execution. First the system must be configured. FIG. 2 shows a flowchart summarizing the setup procedure. This includes configuring the propagator, orbit

TABLE 1

| NOTATIONS USED IN ALGORITHM | |
| --- | --- |
| $(\hat{\ })$ - | Best Estimate at time $t_0$ |
| * - | Nominal |
| $(\dot{\ })$ - | Time Derivative |
| $()_{gs}$ - | Ground Station |
| $t_{IC}$ - | Epoch of Initial Condition |
| $t_0$ - | Epoch of Estimated State |
| $t_1$ - | Time of First Measurement |
| $t_l$ - | Time of Last (lth) Measurement | determination parameters, specifying file names, and setting up such things as the epoch for estimation, the final epoch to which the final estimate is propagated, etc. The initial state and associated covariance also must be initialized. Following the setup, the user must choose those states to be estimated. The differential correction or estimation algorithm is invoked. This provides the best estimate solution and associated covariance. These are then propagated to the final epoch. A summary report is then published which lists important information used in the estimation problem.

The problem of orbit determination and prediction is inherently nonlinear, so the equations of motion must be linearized for the batch algorithm. The nominal state, X*, can be integrated directly; however, the state transition matrix, $\phi$, must be integrated using the linearized state variable relations. This is accomplished by taking the partial derivatives of the differential equations governing the equations of motion, labeled F, with respect to the state variables. The partial derivative matrix is labeled the A matrix. These form the variational equations.

$$\dot{X} = F(X^*, t) \tag{2}$$

$$\Phi(t_i, t_{i-1}) = A(X^*, t_i)\Phi(t_i, t_{i-1}) \tag{3}$$

$$A(X^*, t_i) = \frac{\partial F(X^*, t_i)}{\partial X} \tag{4}$$

Eqs. 1 and 2 can be numerically integrated from one measurement to the next. In OCEAN, Eq. 2 can be computed analytically or semi-analytically. This is done for the state transition matrix. The advantage of the analytical technique is an increase in speed of execution; however, the approximations used in these techniques sometimes causes divergence or an increase in the number of iterations required to converge. Note that the nominal trajectory, X*, 12 is used in each equation.

The key to the orbit determination is through the observation-state relationship. This, as its name implies, connects the observations to the defined state. A theoretical model is developed for each measurement type. When an actual measurement is taken, there is a difference or error between the actual and modeled measurements. Since the model uses the state in its computation, the observations and states are related by $$Y_i = G_i(X_i, t_i) + \epsilon_i \tag{5}$$

where
$Y_i$=p×1 vector of observations at $t_i$
$G_i$=p×1 vector of theoretical observations as a function of the states at $t_i$ $\epsilon_i$=p×1 vector of observation errors at $t_i$ p=number of observations at $t_i$ For example, in satellite application, if both a range, $\rho$, and range rate, $\dot{\rho}$, measurements were taken at time $t_i$ then the vectors are defined as:

$$Y_i = \begin{bmatrix} \rho_{meas} \\ \dot{\rho}_{meas} \end{bmatrix}$$

$$G_i = \begin{bmatrix} \sqrt{(x-x_{gs})^2 + (y-y_{gs})^2 + (z-z_{gs})^2} \\ \vec{r} - \vec{r}_{gs} \cdot (\vec{r} - \vec{r}_{gs})/\rho \end{bmatrix}$$

$$= \begin{bmatrix} \sqrt{(x-x_{gs})^2 + (y-y_{gs})^2 + (z-z_{gs})^2} \\ \|r-r_{gs}\| \cdot (r-r_{gs}) \end{bmatrix}$$

$$\epsilon_i = \begin{bmatrix} \epsilon_\rho \\ \epsilon_{\dot{\rho}} \end{bmatrix}$$

The weight, W, for each observation is inversely proportional to the observation noise squared, $\sigma^2$. It is assumed that the observation error, $\epsilon$, is random with zero mean and specified covariance. In this case, the weight is equal to the inverse of the expected value of the observation error squared.

$$W = R^{-1} = \frac{1}{\sigma^2} = \begin{bmatrix} \frac{1}{\sigma_1^2} & & \\ & \ddots & \\ & & \frac{1}{\sigma_p^2} \end{bmatrix} \quad (6)$$

where $$R = E[\epsilon_i \epsilon_i^T] \quad (7)$$

and p is the number of measurements at time $t_i$.

Each observation, Y, is compared to the theoretical observation, G, one measurement at a time. The difference between the two values is called the residual, labeled with a lower case y.

$$residual = Y_i - G(X^*, t_i) = y_i \quad (8)$$

Batch estimation involves calculating the partial derivatives of the theoretical observation, G, with respect to the state variables, X, evaluated along the nominal reference trajectory 12, X*. This (p×n) matrix is called the measurement sensitivity matrix and is labeled $\tilde{H}$.

$$\tilde{H}_i = \frac{\partial G(X^*, t_i)}{\partial X} \quad (9)$$

The $\tilde{H}$ matrix is evaluated at the measurement time $t_i$. It must be mapped back to the initial time, $t_0$, since the goal is to estimate the state at time $t_0$. This is performed by multiplying $\tilde{H}$ by the matrix obtained from Eq. 3 evaluated from $t_i$ to $t_0$.

$$H_i = \tilde{H}_i \phi(t_i, t_0) \quad (10)$$

The sensitivity matrix for measurement, i, evaluated at $t_0$ ($H_i$) is combined with $R^{-1}$ of Eq. 6 and accumulated for each observation in the following manner.

$$M = \sum_{i=1}^{l} (H_i^T R_i^{-1} H_i) \quad (11)$$

where l is the total number of measurements. This matrix is the inverse of the covariance matrix, P.

$$M^{-1} = P = |H^T R^{-1} H|^{-1} \quad (12)$$

Likewise, the H matrix is combined with R and the residual, y, for each observation to form the L matrix.

$$L = \sum_{i=1}^{l} H_i^T R_i^{-1} y_i \quad (13)$$

The H matrix can be accumulated in a matrix of dimension p×n, where p is the maximum number of measurements at the time $t_i$, or each measurement sensitivity can be placed in a separate row within the matrix resulting in a final dimension of m×n, where m=p×l and l is the total number of measurements. In the former case, R will be of dimension p×p whereas in the latter case R will be of dimension m×m.

Using Eqs. 11 and 13, the batch algorithm provides an estimate of the error, $\hat{x}$, in the nominal trajectory.

$$\hat{x} = M^{-1} L \quad (14)$$

Therefore, the full form of Eq.13 is $$\hat{x} = |H^T W^{-1} H|^{-1} H^T R^{-1} y \quad (15)$$

or $$\hat{x} = |H^T R^{-1} H|^{-H^T} W y. \quad (16)$$

The estimate of the error, $\hat{x}$, is then used to update the nominal trajectory, X*, at time, $t_0$, to provide the best estimate of the state, X, at time $t_0$. Repeating Eq.1

$$\hat{X}_0 = X^*_0 + \hat{x}_0.$$

If the batch algorithm is exercised again, then the best estimate of the trajectory becomes the nominal.

$$X^*_0 = \hat{X}_0 \quad (17)$$

This can be performed iteratively until convergence.

The test for convergence is satisfied when the difference between the root-mean-square (rms) values of two successive batch iterations is less than the observation noise, $\sigma$, or some user defined value. In this case, the rms is the sum of the square of the residuals divided by the total number of observations, N, while the residual is the difference between the actual and theoretical observation evaluated along the nominal trajectory.

$$\text{residual} = Y_i - G(X^*, t_i) = y_i \quad (18)$$

$$\text{rms} = \sqrt{\frac{\sum_{i=1}^{N} y^2}{N}} \quad (19)$$

$$(\text{rms}_j - \text{rms}_{j-1}) < \sigma \equiv \text{convergence} \quad (20)$$

Figure 3:
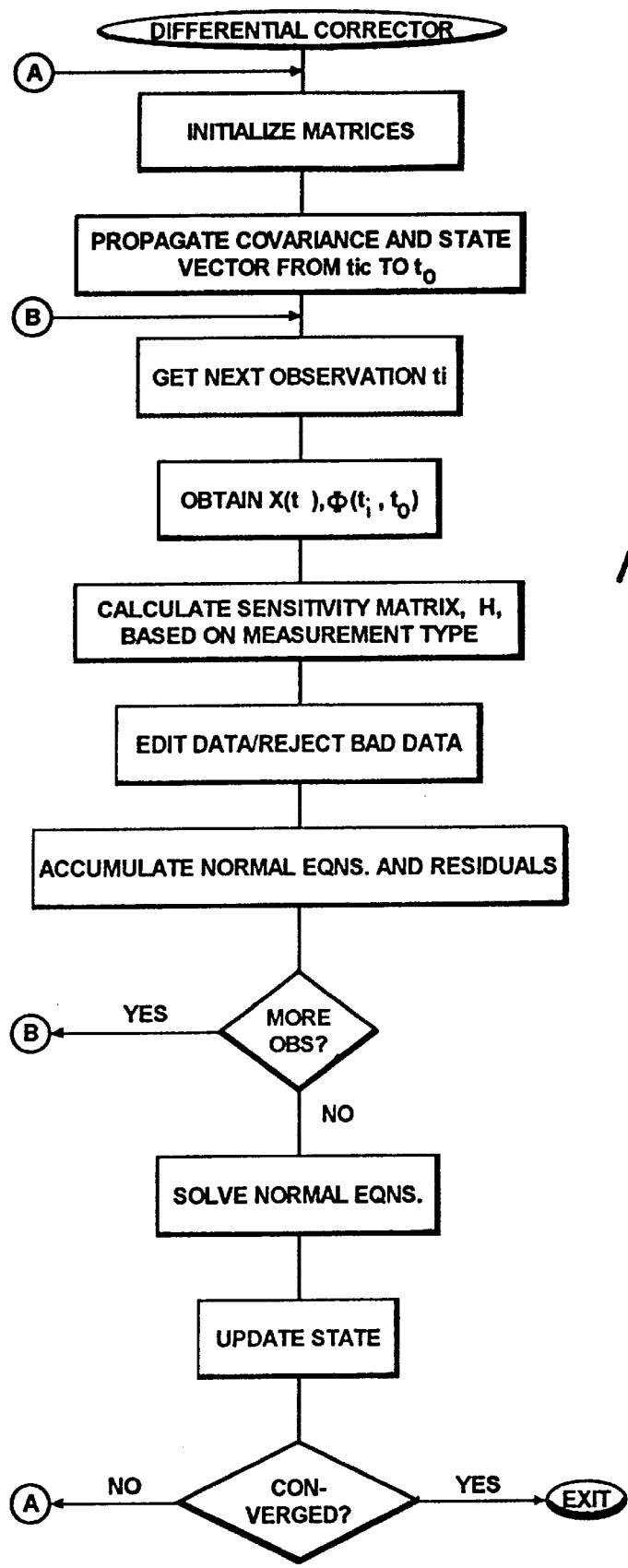
FIG. 3 shows a flowchart graphically depicting the weighted least squares algorithm.

The weighted least squares algorithm (WLS) is implemented in the OCEAN prototype as listed sequentially below and can be found graphically in FIG. 3.

Given: A nominal estimate of the state, $X^*_{IC}$, at the initial time, $t_{IC}$, an initial covariance matrix, $P_{IC}$, and an estimate epoch, $t_0$ and a final epoch, $t_f$, and an estimate of noise, $\sigma$.

1. Initialize: weights and covariance matrices. Null M matrix, L matrix.
2. Propagate covariance matrix and state from $t_{IC}$ to $t_0$.
3. Set $t_{i-1} = 0$.
4. Read next (first) observation at time $t_i$.
5. Integrate nominal trajectory and state transition matrix from $t_{i-1}$ to $t_i$.
6. Calculate sensitivity matrix $H_t$ at $t_i$.
7. Map $H_i$ to time $t_0$ and label it H.
8. Calculate theoretical observation, G.
9. Calculate residual, y.
10. Edit data. Check elevation constraint and bad residual limit. If low elevation or bad residual, goto 4.
11. Accumulate residuals.
12. Accumulate normal equations (evaluate M, and L matrices).
13. More observations? If last observation, goto 14. Else set $T_{i-1} = t_i$ and goto 4.
14. Solve normal equations and estimate error in the state, $\hat{x}$.
15. Update nominal state $X^*_0$ by adding $\hat{x}$.
16. Compute rms.
17. Test convergence using rms. If n)t converged, goto 1. If converged, stop.

The OCEAN software allows new measurement models to be incorporated into the program by inserting a subprogram describing the measurement as a function of the state variables. A standard interface is used to pass state variable information to the measurement subprogram and receive predicted measurements and sensitivities from the subprogram.

The state vector represents those parameters of the dynamical problem that a user may wish to estimate or consider. Each parameter is assigned an element within the state error. Table 2 lists the state elements, variable names, a description of the state, and default units. The user may choose to estimate any state simply by setting an appropriate estimation flag corresponding to that state. Therefore, any number of states may be estimated.

Referring again to FIG. 1, the current state vector is comprised of satellite parameters, ground station 15 locations, ground station parameters, and miscellaneous parameters. The program can be configured at compile time for the maximum allowable number of satellites 16 and ground stations 15, each of these will be discussed below. For each satellite 16, eleven parameters can be estimated. They are: three states corresponding to the satellite's 16 position; three states corresponding to the satellites 16 velocity; a coefficient of drag; a decay state; a reflectivity coefficient; and two states for frequency offset and drift of the satellite's 16 clock, if required.

Each ground station 15 may have multiple antennas. For each ground station 15, the position of each antenna, and the

TABLE 2

TABLE OF ESTIMATED PARAMETERS

| State | Variable | Description | Units | Label |
|---|---|---|---|---|
| x(1) | xsc(1,1) | x absolute ECI position of s/c 1 | km | xsat1 |
| x(2) | xsc(1,2) | y absolute ECI position of s/c 1 | km | ysat1 |
| x(3) | xsc(1,3) | z absolute ECI position of s/c 1 | km | zsat1 |
| x(4) | xsc(1,4) | x absolute ECI velocity of s/c 1 | km/sec | vxsat1 |
| x(5) | xsc(1,5) | y absolute ECI velocity of s/c 1 | km/sec | vysat1 |
| x(6) | xsc(1,6) | z absolute ECI velocity of s/c 1 | km/sec | vzsat1 |
| x(7) | Cd(1) | coefficient of drag of s/c 1 | $m^2$/kg | Cdsat1 |
| x(8) | adot(1) | decay rate of s/c 1 | km/sec | adsat1 |
| x(9) | reflcoef(1) | reflectivity coefficient of s/c 1 |  | Crsat1 |
| x(10) | freq_offset(1) | frequency offset of s/c 1 | Hz | fsat1 |
| x(11) | freq_drift(1) | frequency drift of s/c 1 | Hz/sec | fdsat1 |
| x(12) | xsc(2,1) | x absolute ECI position of s/c 2 | km | xsat2 |
| x(13) | xsc(2,2) | y absolute ECI position of s/c 2 | km | ysat2 |
| x(14) | xsc(2,3) | z absolute ECI position of s/c 2 | km | zsat2 |
| x(15) | xsc(2,4) | x absolute ECI velocity of s/c 2 | km/sec | vxsat2 |
| x(16) | xsc(2,5) | y absolute ECI velocity of s/c 2 | km/sec | vysat2 |
| x(17) | xsc(2,6) | z absolute ECI velocity of s/c 2 | km/sec | vzsat2 |
| x(18) | Cd(2) | coefficient of drag of s/c 2 | $m^2$/kg | Cdsat2 |
| x(19) | adot(2) | decay rate of s/c 2 | km/sec | adsat2 |
| x(20) | reflcoef(2) | reflectivity coefficient of s/c 2 |  | Crsat2 |
| x(21) | freq_offset(2) | frequency offset of s/c 2 | Hz | fsat2 |
| x(22) | freq_drift(2) | frequency drift of s/c 2n | Hz/sec | fdsat2 |
| x(23) | xsc(3,1) | x absolute ECI position of s/c 3 | km | xsat3 |
| x(24) | xsc(3,2) | y absolute ECI position of s/c 3 | km | ysat3 |
| x(25) | xsc(3,3) | z absolute ECI position of s/c 3 | km | zsat3 |
| x(26) | xsc(3,4) | x absolute ECI velocity of s/c 3 | km/sec | vxsat3 |
| x(27) | xsc(3,5) | y absolute ECI velocity of s/c 3 | km/sec | vysat3 |
| x(28) | xsc(3,6) | z absolute ECI velocity of s/c 3 | km/sec | vzsat3 |

TABLE 2-continued

TABLE OF ESTIMATED PARAMETERS

| State | Variable | Description | Units | Label |
|---|---|---|---|---|
| x(29) | Cd(3) | coefficient of drag of s/c 3 | $m^2$/kg | Cdsat3 |
| x(30) | adot(3) | decay rate of s/c 3 | km/sec | adsat3 |
| x(31) | reflcoef(3) | reflectivity coefficient of s/c 3 | | Crsat3 |
| x(32) | freq_offset(3) | frequency offset of s/c 3 | Hz | fsat3 |
| x(33) | freq_drift(3) | frequency drift of s/c 3 | Hz/sec | fdsat3 |
| x(34) | xsc(4,1) | x absolute ECI position of s/c 4 | km | xsat4 |
| x(35) | xsc(4,2) | y absolute ECI position of s/c 4 | km | ysat4 |
| x(36) | xsc(4,3) | z absolute ECI position of s/c 4 | km | zsat4 |
| x(37) | xsc(4,4) | x absolute ECI velocity of s/c 4 | km/sec | vxsat4 |
| x(38) | xsc(4,5) | y absolute ECI velocity of s/c 4 | km/sec | vysat4 |
| x(39) | xsc(4,6) | z absolute ECI velocity of s/c 4 | km/sec | vzsat4 |
| x(40) | Cd(4) | coefficient of drag of s/c 4 | $m^2$/kg | Cdsat4 |
| x(41) | adot(4) | decay rate of s/c 4 | km/sec | adsat4 |
| x(42) | reflcoef(4) | reflectivity coefficient of s/c 4 | | Crsat4 |
| x(43) | freq_offset(4) | frequency offset of s/c 4 | Hz | fsat4 |
| x(44) | freq_drift(4) | frequency drift of s/c 4 | Hz/sec | fdsat4 |
| x(45) | xgs(1,1) | x ECF location of ground station antenna 0 at site 1 | km | xgs1.0 |
| x(46) | xgs(1,2) | y ECF location of ground station antenna 0 at site 1 | km | ygs1.0 |
| x(47) | xgs(1,3) | z ECF location of ground station antenna 0 at site 1 | km | zgs1.0 |
| x(48) | xgs(2,1) | x ECF location of ground station antenna 0 at site 2 | km | xgs2.0 |
| x(49) | xgs(2,2) | y ECF location of ground station antenna 0 at site 2 | km | ygs2.0 |
| x(50) | xgs(2,3) | z ECF location of ground station antenna 0 at site 2 | km | zgs2.0 |
| x(51) | xgs(3,1) | x ECF location of ground station antenna 0 at site 3 | km | xgs3.0 |
| x(52) | xgs(3,2) | y ECF location of ground station antenna 0 at site 3 | km | ygs3.0 |
| x(53) | xgs(3,3) | z ECF location of ground station antenna 0 at site 3 | km | zgs3.0 |
| x(54) | xgs(4,1) | x ECF location of ground station antenna 0 at site 4 | km | xgs4.0 |
| x(55) | xgs(4,2) | y ECF location of ground station antenna 0 at site 4 | km | ygs4.0 |
| x(56) | xgs(4,3) | z ECF location of ground station antenna 0 at site 4 | km | zgs4.0 |
| x(57) | xgs(5,1) | x ECF location of ground station antenna 0 at site 5 | km | xgs5.0 |
| x(58) | xgs(5,2) | y ECF location of ground station antenna 0 at site 5 | km | ygs5.0 |
| x(59) | xgs(5,3) | z ECF location of ground station antenna 0 at site 5 | km | zgs5.0 |
| x(60) | xgs(6,1) | x ECF location of ground station antenna 0 at site 6 | km | xgs6.0 |
| x(61) | xgs(6,2) | y ECF location of ground station antenna 0 at site 6 | km | ygs6.0 |
| x(62) | xgs(6,3) | z ECF location of ground station antenna 0 at site 6 | km | zgs6.0 |
| x(63) | xgs(7,1) | x ECF location of ground station antenna 0 at site 7 | km | xgs7.0 |
| x(64) | xgs(7,2) | y ECF location of ground station antenna 0 at site 7 | km | ygs7.0 |
| x(65) | xgs(7,3) | z ECF location of ground station antenna 0 at site 7 | km | zgs7.0 |
| x(66) | gsfbias(1,1) | frequency bias for site 1 antenna 0 | m | gsfbs1.0 |
| x(67) | gsfbias(1,2) | frequency bias for site 1 antenna 1 | m | gsfbs1.1 |
| x(68) | gsfbias(1,3) | frequency bias for site 1 antenna 2 | m | gsfbs1.2 |
| x(69) | gsfbias(1,4) | frequency bias for site 1 antenna 3 | m | gsfbs1.3 |
| x(70) | gsfbias(2,1) | frequency bias for site 2 antenna 0 | m | gsfbs2.0 |
| x(71) | gsfbias(2,2) | frequency bias for site 2 antenna 1 | m | gsfbs2.1 |
| x(72) | gsfbias(2,3) | frequency bias for site 2 antenna 2 | m | gsfbs2.2 |
| x(73) | gsfbias(2,4) | frequency bias for site 2 antenna 3 | m | gsfbs2.3 |
| x(74) | gsfbias(3,1) | frequency bias for site 3 antenna 0 | m | gsfbs3.0 |
| x(75) | gsfbias(3,2) | frequency bias for site 3 antenna 1 | m | gsfbs3.1 |
| x(76) | gsfbias(3,3) | frequency bias for site 3 antenna 2 | m | gsfbs3.2 |
| x(77) | gsfbias(3,4) | frequency bias for site 3 antenna 3 | m | gsfbs3.3 |
| x(78) | gsfbias(4,1) | frequency bias for site 4 antenna 0 | m | gsfbs4.0 |
| x(79) | gsfbias(4,2) | frequency bias for site 4 antenna 1 | m | gsfbs4.1 |
| x(80) | gsfbias(4,3) | frequency bias for site 4 antenna 2 | m | gsfbs4.2 |
| x(81) | gsfbias(4,4) | frequency bias for site 4 antenna 3 | m | gsfbs4.3 |
| x(82) | gsfbias(5,1) | frequency bias for site 5 antenna 0 | m | gsfbs5.0 |
| x(83) | gsfbias(5,2) | frequency bias for site 5 antenna 1 | m | gsfbs5.1 |
| x(84) | gsfbias(5,3) | frequency bias for site 5 antenna 2 | m | gsfbs5.2 |
| x(85) | gsfbias(5,4) | frequency bias for site 5 antenna 3 | m | gsfbs5.3 |
| x(86) | gsfbias(6,1) | frequency bias for site 6 antenna 0 | m | gsfbs6.0 |
| x(87) | gsfbias(6,2) | frequency bias for site 6 antenna 1 | m | gsfbs6.1 |
| x(88) | gsfbias(6,3) | frequency bias for site 6 antenna 2 | m | gsfbs6.2 |
| x(89) | gsfbias(6,4) | frequency bias for site 6 antenna 3 | m | gsfbs6.3 |
| x(90) | gsfbias(7,1) | frequency bias for site 7 antenna 0 | m | gsfbs7.0 |
| x(91) | gsfbias(7,2) | frequency bias for site 7 antenna 1 | m | gsfbs7.1 |
| x(92) | gsfbias(7,3) | frequency bias for site 7 antenna 2 | m | gsfbs7.2 |
| x(93) | gsfbias(7,4) | frequency bias for site 7 antenna 3 | m | gsfbs7.3 | frequency bias for all antennas at a site can be estimated. It is assumed that any other antennas at the given site are known well in relation to each other, so estimating one ground station 12 implies improvement in knowledge of all antennas. Treating individual antennas as if one ground station 15 as a plurality of ground stations 15 is easily accomplished, if desired.

All of the underlying orbital calculations performed in the software are made in the Mean Equator and equinox of J2000.0 coordinate frame. The internal time scale for all computation is International Atomic Time (TAI). It is convenient to carry out the trajectory integration in this coordinate frame and time scale; however, depending on the application, the state of the satellite 16 may be referenced to other coordinate frames and time scales. For example, most satellite 16 tracking measurements are referenced to an Earth 13 fixed coordinate frame and to Coordinated Universal Time (UTC).

The OCEAN software provides a variety of optional output coordinate frames and time scales:

Coordinate Frames:

1. Mean Equator and Equinox of J2000.0
2. Mean Ecliptic and Equinox of J2000.0
3. Mean Ecliptic and Equinox of Date
4. True Ecliptic and Equinox of Date
5. Mean Equator and equinox of Date
6. True Equator and equinox of Date
7. Instantaneous Terrestrial System (rotating or inertial velocity)
8. Conventional Terrestrial System (rotating or inertial velocity)
9. Mean Equator and Equinox of B1950.0

Time Scales:

1. International Atomic time (TAI)
2. Coordinated Universal Time (UTC)
3. Global Positioning System Time
4. Universal Time (UT1)
5. Barycentric Time (TDB)
6. Terrestrial Time (TT)

The difference between UTC and the fundamental time scale (TAI) changes as leap seconds are added. To account for this, the software uses an external file containing the past and future leap second additions. In this way, the software can operate smoothly through leap second events. The predicted and historical differences between UT1 and TAI are also used by the software to automatically account for changes in the Earth 13 rotation.

To accomplish these coordinate transformations and time scale variations, and to enhance the overall modeling capability of the software, OCEAN makes use of several existing computer subprograms. These programs are listed below along with their source that are well known to those skilled in the art.

| Program | Source |
| --- | --- |
| DE200 Planetary Ephemeris | Jet propulsion Laboratory, Pasadena, CA |
| USNO Planetary Ephemeris | US Naval Observatory, Washington, DC |
| USNO Earth Nutation | US Naval Observatory, Washington, DC |
| SGP4 Orbit Propagator | US Space Command, Colorado Springs, CO |
| PPT2 Orbit Propagator | US Naval Space Command, Dahlgren, VA |

Biases for each measurement type selected can be estimated. A single bias can be estimated for the entire data span, or pass by pass biases can be estimated. Biases may be estimated for satellite 16, ground station 15 or by link (satellite-station pair).

Some equations used in OCEAN make use of the transformation matrix which defines the rotation from the CTIS to the Inertial J2000.0 system. This transformation includes the effects of precession, nutation, polar motion, and ΔUT1. These corrections can be combined into a single 6×6 matrix. This process is well known to those skilled in the art. The polar motion and ΔUT1 coefficients are automatically incorporated into the orbit estimation file input. The Greenwich hour angle (GHA) rotation matrix, however, differs for position and velocity vectors. The effects of the transport theorem, which relates inertial to rotating reference frames, must be used when evaluating the velocity terms. Note the precession, nutation, and polar motion corrections have angular rates associated with them that can be accounted for by using the transport theorem, but rates are small enough to be considered negligible.

OCEAN software processes six classes of tracking types: angles, absolute range, relative range, range rate, integrated Doppler, and intersatellite range data. There are additional variations in each of these classes to account for idiosyncrasies in actual tracking systems which are currently in use. However, these six broad classes of tracking types accommodate most available tracking systems.

Each of these classes of tracking types is modeled with respect to the orbit of the satellite(s), the orientation of the Earth and the location of the tracking station on the earth. These models are necessarily a function of polar motion and ΔUT1.

These measurements contain error sources due to mismodeled or unmodeled physical effects, as well as time and/or frequency measuring devices associated with the satellite and/or the tracking station. These error terms are estimated in OCEAN 10 alone or in combination. The errors are modeled as a constant or a piecewise constant of time.

Antenna offsets are used to compensate for the difference between the location the signal is received at the satellite 16 and the center of mass of the satellite 16. This correction becomes especially important for signals that arrive at antennas that are far from the center of mass, for satellites 16 with large amplitude attitude changes, and for highly accurate passive ranging techniques such as satellite 16 laser ranging. The database allows the program to be configured to correct the tracking observations for the effects of an antenna offset.

Figure 4:
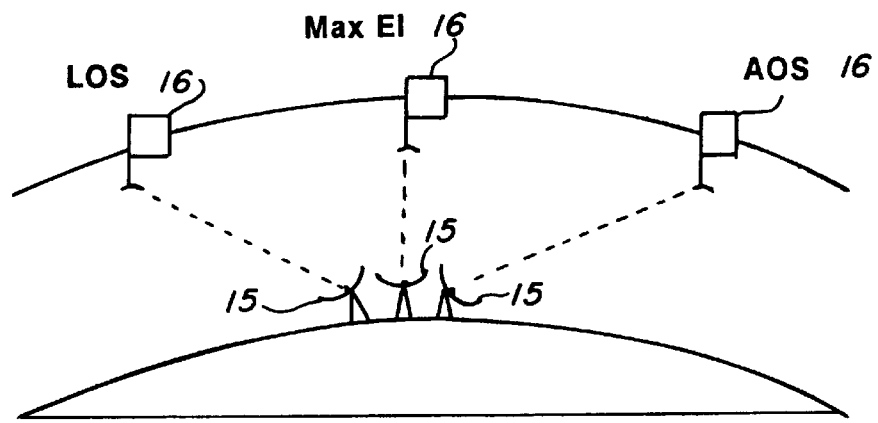
FIG. 4 shows the angular errors associated with a nadir pointing satellite with the antennas offset from the center of the mass in a fixed position.
Figure 5:
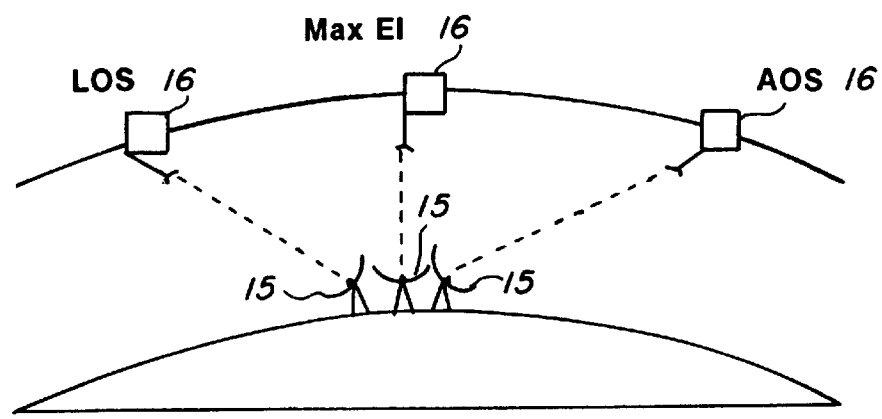
FIG. 5 shows the angular errors associated with a nadir pointing satellite with the antennas pointed toward te ground station.

FIGS. 4 and 5 demonstrate the angular error associated with a nadir or fixed pointing satellite 16 with a receive antenna offset from the center of the mass. In FIG. 4 the antenna is fixed while in FIG. 5 the antenna points toward the ground station 15. The ground station 15 is depicted in the three different phases as it tracks the satellite 16. The phases are Acquisition of Signal (AOS), the maximum elevation (MaxEl), and the Loss of Signal (LOS). Note the range from the station 15 to the phase center of the satellite 16 antenna is different than the range from the station 15 to the satellite 16 center of mass. It is the position and velocity of the center of mass that is estimated in the WLS-OD problem.

The secondary effect of antenna offsets are active vs. passive tracking by the satellite 16 antenna. If the antenna can be pointed toward the target, in this case the ground station 12, then the antenna offset effect is reduced. This effect is usually small and is not applied in OCEAN. All antennas are considered passive and fixed in orientation with respect to the satellite 16.

Figure 6:
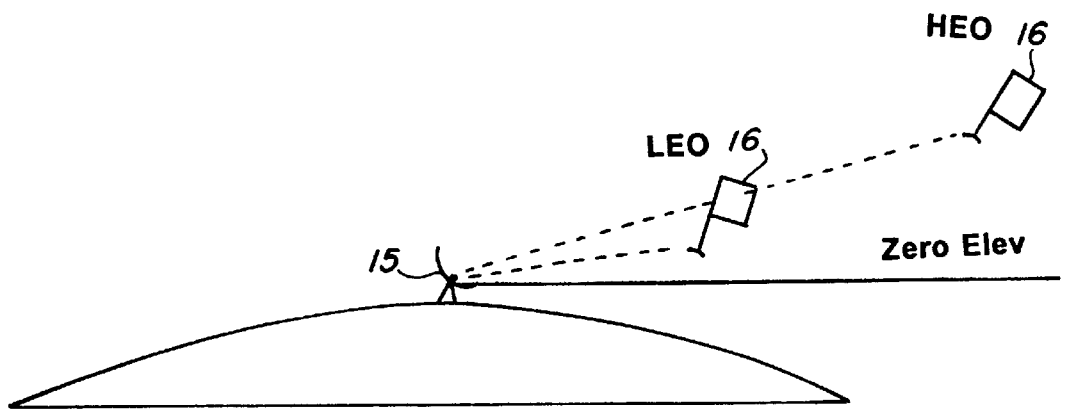
FIG. 6 shows antenna tracking for nadir-pointing higher altitude satellite.

Note the curvature of the Earth 13 is not taken into account in FIGS. 4 and 5. For a nadir pointing satellite 16, the curvature of the earth 13 reduces the angular error due to geometry. The higher the altitude of the satellite 16 the lower the error at low elevations. FIG. 6 demonstrates this effect. Note the angular difference between the line of sight vector from the station 15 to the satellite 16 and the nadir pointing antenna is lower (i.e., the line of sight vector and the antenna are more collinear) for the HEO satellite than the LEO. The macro models in OCEAN automatically incorporate the curvature effect.

Two antenna models are used in OCEAN. One is a generic model based on a nadir-pointing satellite 16 rotated by a roll-pitch-yaw series of attitude angles and the second model is based on the TOPEX satellite.

The state transition matrix (STM) relates the state at one time to the state at another time. The STM can be computed in this program one of two ways: (1) using an analytical two-body approximation for the satellite 16 dynamical equations of motion; and (2) integrating the variational equations. When estimating ground station 15 parameters such as the station 15 location, transformations of the STM from CTS to inertial coordinates are modeled, as discussed below.

Integration of the variational equations provides a method for reducing the amount of approximation and linearization and allows the estimation of such parameters as coefficient of drag and reflectivity coefficient. This may improve the rate of convergence.

The state transition matrix used by OCEAN is a hybrid set of coordinates that contains both state information for the satellite in J2000.0 coordinates and information for the stations in CTS coordinates. At each new observation time, the state and state transition matrix are computed. The satellite parameters are integrated to the observation time while the station locations remain fixed in CTS coordinates. The result is a consistent state, STM, and observation sensitivities in J2000.0/CTS hybrid coordinates.

The state vector at the estimation epoch (See, Table 2) is a hybrid J2000.0/CTS state, where the satellite 16 coordinates are stored on J2000.0 and the station 15 location are stored in CTS coordinates. When the partial derivatives are computed, the station 15 CTS coordinates in the state are transformed to J2000.0 coordinates at the observation epoch $t_i$. Since the partials form the sensitivity matrix and since the sensitivity matrix is used to update the state, the sensitivity matrix must be converted to a hybrid J2000.0/CTS set of coordinates. This is accomplished using the state transition matrix.

The hybrid state transition matrix maps the state at one epoch to the state at another epoch. In this application, the first part of the hybrid STM, $\phi_{J2000.0/J2000.0}(t_i,t_0)$ maps the partial derivatives from the observation epoch $t_i$ to the estimation epoch $t_0$. The second part $\phi_{J2000.0/CTS}(t_0,t_0)$ maps the partial derivatives from J2000.0 to CTS for the station 15 states using the matrice formulation of Eqs. 21 and 22.

$$x_{J2000.0} = (C^{nut}C^{prec})^T\ C^{GHA}C^{PM}x_{CTS}, \quad (21)$$

$$x_{J2000.0} = (C^{nut}C^{prec})^T\ C^{GHA}C^{PM}x_{CTS} + (C^{nut}C^{prec})^T\ C^{GHA}C^{PM}\dot{x}_{CTS} \quad (22)$$

Therefore, Eq. 11 can be rewritten more explicitly as:

$$H_{i\_J2000.0/CTS} = H_{i,J2000.0/J2000.0}\phi_{J2000.0/J2000.0}(t_i,t_0)\phi_{J2000.0/CTS}(t_0,t_0) \quad (23)$$

where $$\phi_{J2000.0/J2000.0}(t_i,t_0) = \phi_{J2000.0/CTS}(t_i,t_0)\phi_{CTS/CTS}(t_i,t_0)\phi_{CTS/J2000.0}(t_0,t_0) \quad (24)$$

Note the interior STM $\phi_{CTS/CTS}(t_i,t_0)$ which transforms CTS coordinates from time $t_0$ to time $t_i$ is simply the identity matrix if the ground station 15 is assumed to be stationary. If the station has movement then this matrix is not the identity matrix.

Partial derivatives are required to compute the sensitivities of the measurements with respect to the states. The partial derivatives for each measurement type are well known to those skilled in the art.

Since the integrated doppler measurement is actually a range difference between two successive measurements, the partial derivatives of the two successive measurements for a given satellite 16 are differenced. The sensitivity matrix elements must also be mapped to the estimation epoch before differencing using the state transition matrix at each respective measurement time $$\frac{\partial \Delta R(t_i)}{\partial \text{state}(t_0)} = \frac{\partial \text{range}(t_i)}{\partial \text{state}(t_i)}\Phi(t_i,t_0) - \frac{\partial \text{range}(t_{i-1})}{\partial \text{state}(t_{i-1})}\Phi(t_{i-1},t_0) \quad (25)$$

For this data type the measurement sensitivities are saved from one measurement to the next measurement by satellite 16 to allow OCEAN to process multiple satellites 16 simultaneously.

Figure 7:
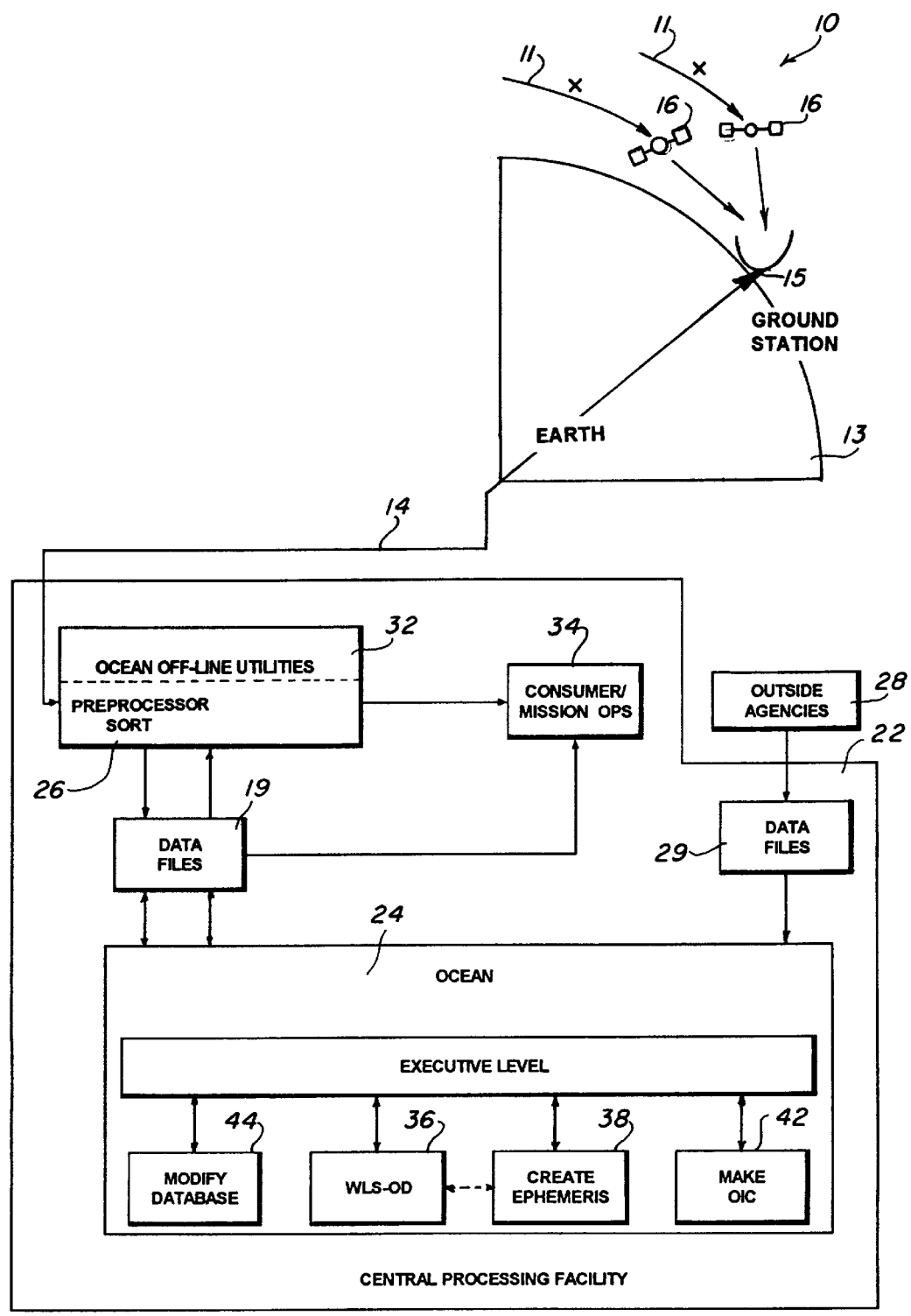
FIG. 7 shows an operational view of an Orbit/Covariance Estimation and Analysis (OCEAN) system.

In a preferred embodiment, as shown in FIG. 7 provides an operational overview of the OCEAN system 10. In general, a ground station 15 collects observations of a satellite 16 passing overhead. The raw observations or data 14 are sent to a central processing facility 22 where OCEAN 24 resides. The OCEAN 24 off-line utility program 26 called Preprocess processes the raw data 14 into files 19 usable by OCEAN 24. Outside agencies 28 also provide files 29 to be used by OCEAN 24. OCEAN 24 is then executed either automatically or manually by a user or consumer/mission operations 34. The preprocessed data file 19 is used and an orbital solution for the satellites 16 involved in the problem is generated and passed to either the consumer 34 or to the OCEAN 24 off-line utilities 32 for further analysis. The main processes within the OCEAN 24 program are the Weighted Least Squares Orbit Determination (WLS-OD) routine 36, the Create Ephemeris (CE) routine 38, Make OCEAN Initial Condition (OIC) routine 42, and the Modify Database (MDB) routine 44.

As previously stated, OCEAN 24 may be run in either the operational (i.e., automatic) or manual mode. In both the automatic and manual modes, OCEAN 24 execution is driven largely by the values in its data base. The data base allows each sub process of OCEAN 24 to be configured independently of all other subprocesses. Additionally, an override file is provided to independently override any data base setting for each subprocess. In the automatic mode, statistical data editing is controlled by the program according to database command settings. None of these activities require operator intervention.

In the manual mode, the user executes OCEAN 24 interactively to examine and analyze different processing strategies. In the manual mode, the user sets the statistical data editing settings interactively.

If OCEAN 24 is run interactively, then OCEAN 24 will output messages or information to the screen (not shown). Some messages require user responses and OCEAN 24 will act on them accordingly. This process continues until OCEAN 24 ends a specific process and prompts the user for the next action.

Before OCEAN 24 can perform the functions WLS-OD 36, CE 38, OIC 42, and MDB 44, all the system 10 parameters required by each function must be correctly initialized. This includes selecting the satellites 16 and ground stations 15 involved in the problem, choosing the states to be estimated, and configuring all remaining parameters that are necessary for successful completion of the selected process. There are two files needed by OCEAN 24 to configure the system for all processes: the installation file and Database file. In addition, other files may be required by a process. For example, the WLS-OD 36 process requires an estimation file and a covariance file.

The first required file for all processes is the installation file. This file contains an input list consisting of keywords and file names that are used to configure the system as shown in Table 3.

The database file is always required However, not all of the files listed in Table 3 are needed in all cases. In addition to those that are needed and specified in the installation file, there are additional files or filenames that are specified by the user.

Table 4 lists all the required or optional files for each process. An optional file means the filenames may be requested depending on how the user has configured the system. For example, if the user wishes to record a residual file during the WLS-OD 36 process and has configured the database properly, OCEAN 24 will prompt the user for the filename, otherwise no request for a residual filename will occur. Table 4 also lists if the file is an Input or Output file (I/O) and the type of interface used to specify the filename, either through the PNAMES.DAT file or specified by the user during runtime.

Figure 8:
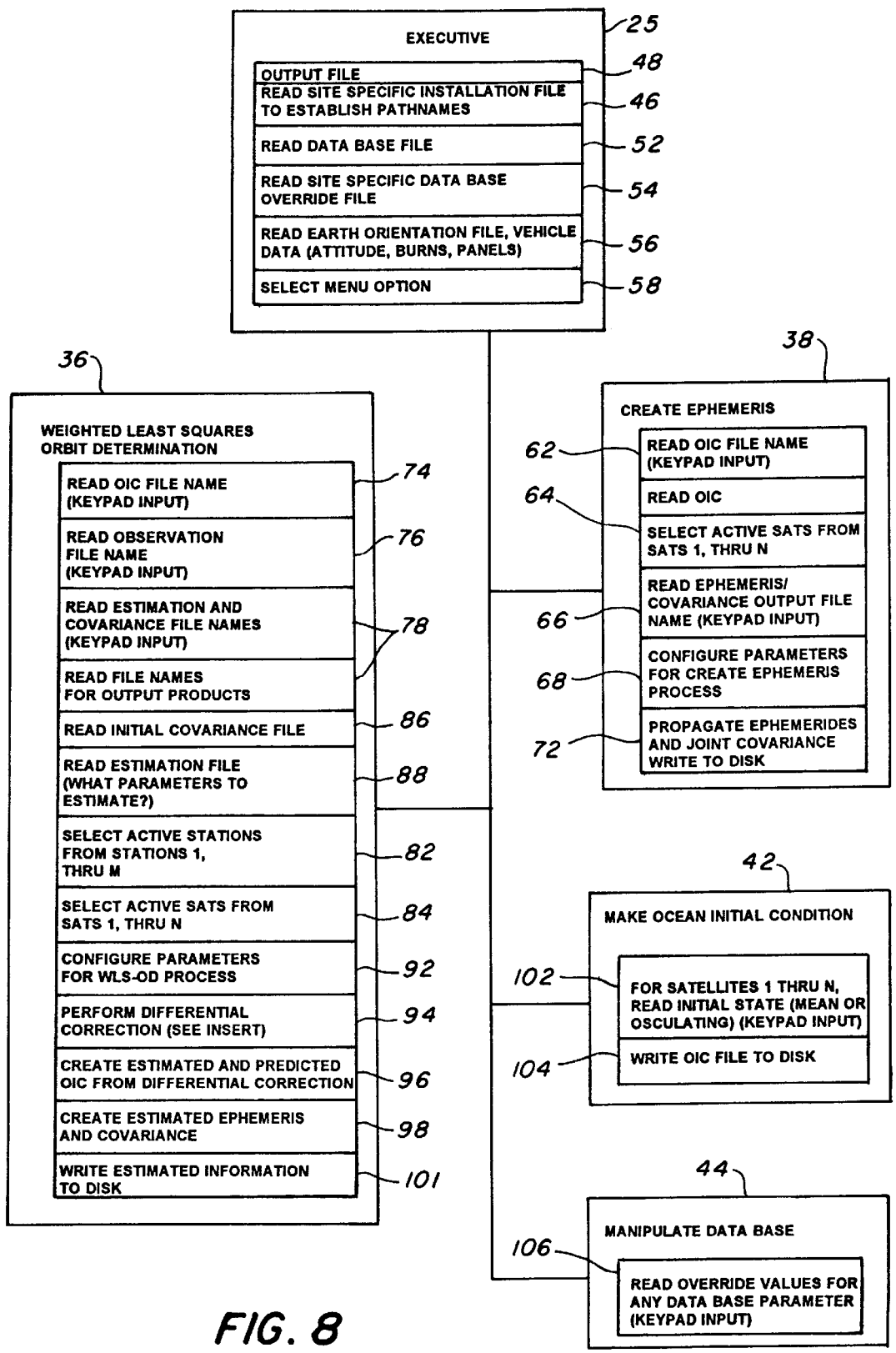
FIG. 8 shows a graphical presentation of the use of the external files for each process in the OCEAN program.

Referring now to FIG. 8. During an Execution of the OCEAN 24 software, the files are used in the following manner for all processes:

1. The installation file 46 is read and the filenames are stored in memory immediately following the start of execution of OCEAN 24.

2. The output file 48 is opened, if the output filename keyword appeared and was valid in installation file.

3. The database file 52 is read.

4. The program checks to see if a supplemental file is specified at the end of the database. If so, the program loads the supplemental databases. Subsequent supplemental databases may be loaded by a supplemental file (e.g., supplemental file 1 may load supplemental file 2.)

5. The program then loads the override file 54.

6. The program checks to see if a supplemental override file is specified at the end of the override file 54.

If so, the program loads the supplemental override file. Subsequent supplemental override files may be

TABLE 3

| Type of File | Keyword | Description |
| --- | --- | --- |
| Database File | BASE_FILE | Contains commands used to configure system |
| Override File | OV_FILE | Contains commands used to override the database |
| Supplemental Directory | SUP_DIR | Lists directory containing supplemental database files |
| Leap Second File | TAIUTC_FILE | Lists dates when a leap second was added |

TABLE 3-continued

| Type of File | Keyword | Description |
| --- | --- | --- |
| Mark 3 File | MK3_FILE | Contains polar motion and Delta UT1 data |
| Burn File | BURN_FILE | Lists all burns that have been applied to a spacecraft |
| Solar Panel File | SP_FILE | Contains solar panel attitude information |
| Attitude Directory | ATT_DIR | Lists directory containing attitude files |
| Output Files | OUT_FILES | Contains a history of results from an OCEAN 24 run. |

TABLE 4

MATRIX OF FILE INTERFACE REQUIREMENTS BY PROCESS

| | PROCESS | | | | | | | | | | |
| --- | --- | --- | --- | --- | --- | --- | --- | --- | --- | --- | --- |
| | Create Ephemeris | | | WLS-OD | | | Make OIC | | | Modify Database | | |
| File | Req | Int | I/O | Req | Int | I/O | Req | Int | I/O | Req | Int | I/O |
| PNAMES.DAT | Y | PN | I | Y | PN | I | Y | PN | I | Y | PN | I |
| Database | Y | PN | I | Y | PN | I | Y | PN | I | Y | PN | I |
| Override | Y | PN | I | Y | PN | I | Y | | | Y | PN | I |
| Supplemental Directory | Opt | PN | I | Opt | PN | I | Opt | PN | I | Opt | PN/Usr | I |
| TAIUTC | Opt | PN | I | Opt | PN | I | | | | | | |
| Mark3 | Opt | PN | I | Opt | PN | I | | | | | | |
| Burn | Opt | PN | I | Opt | PN | I | | | | | | |
| Solar Pressure | Opt | PN | I | Opt | PN | I | | | | | | |
| Attitude Directory | Opt | PN | I | Opt | PN | I | | | | | | |
| Input OIC | Y | Usr | I | Y | Usr* | I | | | | | | |
| Observation | | | | Y | Usr† | I | | | | | | |
| Estimate | | | | Y | Usr | I | | | | | | |
| Covariance | | | | Y | Usr | I | | | | | | |
| Residual | | | | Opt | Usr* | O | | | | | | |
| Fitted OIC | | | | Y | Usr* | O | Y | Usr | O | | | |
| Predicted OIC | | | | Y | Usr* | O | | | | | | |
| Ephemeris | Y | Usr* | O | Opt | Usr* | O | | | | | | |
| Output | Opt | PN* | O | Opt | PN* | O | Opt | PN* | O | Opt | PN* | O |

Legend:
I/O = Input/Output
Int = Interface
Opt = Optional
PN = Filename specified in PNAMES.DAT
Req = Required
Usr = Filename specified by the User
\* = File generated by OCEAN
† = File generated by the Preprocessor loaded by a supplemental file (e.g., Supplemental override file 1 may load supplemental override file 2.)

7. The program loads the TAIUTC, Mark3, and burn files 56 into memory.

8. The program then requests the user to select which process to run 58.

For the Create Ephemeris 38 process,

9. The program requests the user to specify the input OIC filename 62.

10. The user then selects which satellites and ground stations to use 64.

11. The program requests the user to specify the ephemeris filename, if the system was configured to create one 66.

12. The program then sets the active burns, opens the solar panel orientation file, and opens the attitude files, if OCEAN 24 is configured to use them 68.

13. The system is configured and the Create Ephemeris 38 process executes until the ephemeris has been created 72.

14. The ephemeris file is opened and written.

15. The program then returns to step 8 above.

The sequence of operation then differs by process. For the WLS-OD 36 process, 9. The program requests the user to specify the input OIC filename. The file is then loaded 74.

10. The program requests the user to specify the input observation filename 76.

11. The program requests the user to specify the residual filename, if the system was configured to create one 78.

12. The observation file 76 is then loaded and analyzed 78.

13. The user then selects which satellites and ground stations to use 82 and 84, respectively.

14. The program requests the user to specify the fitted and predicted OIC output filenames 78.

15. The program requests the user to specify the ephemeris filename 78, if the system was configured to create one.

16. The program requests the user to specify the estimation and covariance files 78.

17. The program then sets the active burns, opens the solar panel orientation files, and opens the attitude files, if OCEAN 24 is configured to use them 92.

18. The estimation and covariance files are then loaded, read, and analyzed 86 and 88.

19. The system is configured 92 and the WLS-OD 36 estimation process executes until the solution has converged 94.

20. The fitted and predicted (estimated and final) OIC files are open and written 101.

21. The ephemeris file is opened and written 98.

22. The program returns to step 8 above.

For the Make OIC 42 process,

9. The program requests the user to specify the input data to be stored in the OIC. This is satellite orbital state data in the form of Cartesian positions and velocities 102.

10. The system is configured and the Make OIC 42 process executes until the configured data has been stored in the appropriate variables 102.

11. The OIC file is opened and written 104.

12. The program returns to step 8 above.

For the Modify Database 44 process,

9. The program requests the user to specify either supplemental files to be loaded or specific database or override commands which replace current values in the database or override variables, respectively 106.

10. The system is configured.

11. The program returns to step 8 above.

Each process can be configured via the database and override files as the user desires. There are three configurations that demonstrate possible modes of running a process: the minimum, normal, and enhanced configurations. The minimum configuration consists of only the bare minimum files that are required to run the process. The normal configuration consists of those files a user would normally use on a daily basis that may provide accurate but not necessarily precise results. The enhanced configuration consists of all possible files that would enhance the solution and may provide precise results. Table 5 shows the configuration for each process. Note that the residual file is listed as Optional for the WLS-OD 36 process since it does not enhance the orbit but merely provides more data used to analyze the solution.

The OCEAN software prototype is preferably written in Standard FORTRAN 77/90®, however, the same algorithms could be realized using any scientific computer language that will achieve the same outputs. All file interfaces are ASCII text to ensure ease of readability and portability between (computer platforms. The OCEAN prototype has been run on Digital VAX® and Alpha® computers under the OpenVMS® operating system. As it can be seen in the foregoing, the system architecture consists of a single executive program with multiple processes, each performing a unique but interrelated function. The source code consists of a main executive program with a series of subroutines located under it. The subroutines have been nested with each subsequent level of subroutines playing a supporting role to the calling level of subroutines.

The maximum size of a given orbit determination problem is determined by the number of satellites, ground stations, measurement types, and states to be estimated. Global parameter statements used throughout the program allow the maximum problem size to be extended without the need to reprogram any FORTRAN code.

The OCEAN technique is data base driven. Most parameters involved in an orbit determination and prediction problem may be set through the data base without rebuilding the executable module. Logical scripts are used throughout the data base to establish processing strategies including designating the estimation parameters, establishing editing procedures, and determining convergence criteria. A primary, configuration

TABLE 4

MINIMUM, NORMAL, AND ENHANCED CONFIGURATIONS BY PROCESS

| | PROCESS | | | | | | | | | | | |
|---|---|---|---|---|---|---|---|---|---|---|---|---|
| | Create Ephemeris | | | WLS-OD | | | Make OIC | | | Modify Database | | |
| File | Min | Nor | Enh | Min | Nor | Enh | Min | Nor | Enh | Min | Nor | Enh |
| PNAMES.DAT | ● | ● | ● | ● | ● | ● | ● | ● | ● | ● | ● | ● |
| Database | ● | ● | ● | ● | ● | ● | ● | ● | ● | ● | ● | ● |
| Override | | ● | ● | | ● | ● | | | | | | ● |
| Supplemental Directory | | | ● | | | ● | | | | | | ● |
| TAIUTC | | ● | ● | | ● | ● | | | | | | |
| Mark3 | | ● | ● | | ● | ● | | | | | | |
| Burn | | ● | ● | | ● | ● | | | | | | |
| Solar Panel | | | ● | | | ● | | | | | | |
| Attitude Directory | | | ● | | | ● | | | | | | |
| Input OIC | ● | ● | ● | ● | ● | ● | | | | | | |
| Observation | | | | ● | ● | ● | | | | | | |
| Estimate | | | | ● | ● | ● | | | | | | |
| Covariance | | | | ● | ● | ● | | | | | | |
| Residual | | | | | | Opt | | | | | | |
| Fitted OIC | | | | ● | ● | ● | ● | ● | ● | | | |
| Predicted OIC | | | | ● | ● | ● | | | | | | |
| Ephemeris | ● | ● | ● | ● | ● | | | | | | | |
| Output | | ● | ● | | ● | ● | | | | | | |

Legend:
Opt = Optional controlled, data base is maintained to support multiple software installations. Each individual installation may substitute any item in the primary file using a site-specific override file. Communication between the orbit determination and orbit prediction segments of the program is through the OCEAN initial condition OIC file which contains all the information necessary for the orbit predictor to recreate the ephemeris and covariance computed by the orbit determination segment. The OIC includes: satellite position, velocity, drag, and solar pressure coefficients with covariance; satellite physical parameters including mass and area; Earth orientation parameters including polar motion angles and Greenwich hour angle. Timing information for the current and historical accumulation of leap seconds is provided by a single file.

The OCEAN processing algorithm permits any number of satellite orbits to be computed simultaneously. The full program "state" which includes all relevant parameters for each satellite, ground station, and measurement model involved in a particular problem is assembled by the program at execution time. The full state, as seen in Table 2, contain, all the information on the satellites, ground station, and measurement model biases used in an orbit determination problem. There are substates for each satellite and ground station. These substates, along with the measurement bias substate, are used as building blocks to create the full state.

The OCEAN program operates using multiple dimension array pointer variables. These pointer variables point to where in the full state a specific variable lies and whether the state is constant/estimated/considered (C/E/C). Constant values do not change, estimated values are computed from observations, and considered values have covariance affect the results of estimated parameters by limiting the amount an estimated parameter is updated and providing error information.

Now referring to FIG. 9, the full state 121 ("state" column in Table 2) may be examined to see if it is C/E/C by using the pointer or by using the full state index array 122. The full state index array contains a corresponding element for each full state element and indicates, like the substrate pointer arrays, if the state is C/E/C. The full parameter list can be filtered 124 or separated using the full array index. The index array is applied to the full state using the filter resulting in the C/E/C state. If the index contains a "0" it is considered a constant a "1" for an estimated parameter, and a "2" for a consider parameter.

Satellite 16 and ground stations 15 are grouped in separate pointer variables and changing state sizing procedure. In the software, the number of parameters allowed in each satellite 16 and ground station 15 pointer is defined in a single FORTRAN® include a file called the PARAMETER.INC file. Therefore, an additional parameter can be added without requiring significant changes throughout the entire source code.

OCEAN uses a similar filter procedure to collapse matrices. Nonzero values of the index array 122 would indicate if elements of the large matrix 131 should be retained when collapsing the large matrix into a smaller matrix 132. In FIG. 10, the first, fifth, and sixth elements of the index are nonzero so the corresponding elements in the full matrix are extracted to form the collapsed matrix. The index array is formed using a combination of the satellite 16 and ground station 15 pointer variables.

The minimum inputs required by the OCEAN program for any orbit determination problem are the Data Base, estimation file, an Initial Condition File, and an Observation File. The Data Base file contains the force model, describes the satellite 16 and ground station 15 parameters. The estimation file selects the parameters that will be estimated. The Initial Condition file provides satellite 16 position and velocity used to create a reference trajectory for the differential correction or filter processes. The Observation file contains measurements preprocessed into one of the OCEAN observation formats. For precision applications, external data is also required. The Earth Orientation must be obtained to precisely determine the orientation of the Earth 13. OCEAN accepts input from the United States Naval Observatory (USNO) Earth Orientation bulletins. Additional data is included through the external files for vehicle thrusting, attitude, and solar panel orientation. Weather data can also be input for selected observation types. Finally, an external file interface is provided to obtain solar flux and geomagnetic index data for the Jacchia atmospheric density model, a model well known to those skilled in the art.

A number of orbit products are produced by the OCEAN program. Absolute orbit determination can he done simultaneously for any number of satellites. Relative navigation algorithms can be applied for pairs of satellites 16. Fitted and predicted ephemerides are produced for both absolute and relative solutions. Bias estimates for all tracking observation model components, and ground station 15 location errors are computed and reported. These products can be produced automatically with no user interaction or manually using interactive commands from the user.

The OCEAN program addresses requirements specific to multiple satellite 16 orbit determinations, i.e., full cross covariance, relative navigation, and anomaly identification. Enhanced fault isolation is achieved through simultaneous solutions when the entire network is considered as a whole. For example, component errors may become observable when multiple observations across multiple tracking links are combined.

Critical to the design of this technique is the provision for configuring all aspects of the problem from a data base. This implementation allows a single computer code to be applied to a wide variety of orbit determination problems without the need for modification of the computer instructions. Instead the database file is modified to adapt the code to a particular problem.

The data base allows independent configurations for orbit determination and orbit prediction processes. Input data may independently routed to these processes from various sources such as the data base, data base override, or external file. Every data base value may be altered using an application specific override file. Using this override function, a processing site may modify its processing while still maintaining the original data base configuration.

The following documents are hereby incorporated, in total, into this application by reference:

(1) Orbit/Covariance Estimation and Analysis, v__, Math Specifications, Naval Center for Space Technology, Naval Research Laboratory, Washington, DC., 35 pages.

(2) Orbit/Covariance Estimation and Analysis, v__ Software User Manual, Naval Center for Space Technology, Naval Research Laboratory, Washington, DC, 283 pages.

(3) orbit/Covariance Estimation and Analysis, v__ Interface Requirements Specification, Naval Center for Space Technology, Naval Research Laboratory, Washington, DC, 88 pages.

(4) Orbit/Covariance Estimation and Analysis, Operations and Maintenance Manual, Naval Center for Space Technology, Naval Research Laboratory, Washington, DC, 126 pages.

Although the invention has been described in relation to the exemplary embodiment thereof, it will be understood by those skilled in the art that other variations and modifications can be affected in the preferred embodiment without detracting from the scope and spirit of the invention as set forth in the claims.

What is claimed is:

1. A system for estimating the position, velocity and other parameters of each orbital body of a plurality of orbital bodies comprising:

means for receiving emissions from each orbital body of the plurality of orbital bodies;

means for computing an estimated position, velocity, and other parameters of each orbital body of the plurality of orbital bodies, simultaneously; and means for displaying the estimated position, velocity, and other parameters of the each orbital body of the plurality of orbital bodies.

2. A system, as in claim 1, further comprising a means for storing information on the estimated position, velocity, and other parameters of each orbital body of the plurality of orbital bodies.

3. A system, as in claim 1, wherein the means for computing an estimated position, velocity, and other parameters of each orbital body of the plurality of orbital bodies, simultaneously, is a computer.

4. A system, as in claim 1, wherein the means displaying the estimated position, velocity, and other parameters of each orbital body of the plurality of orbital bodies is an x-y plotter.

5. A system, as in claim 1, wherein the means displaying the estimated position, velocity, and other parameters of each orbital body of the plurality of orbital bodies is visual display.

6. A system, as in claim 1, wherein the means displaying the estimated position, velocity, and other parameters of each orbital body of the plurality of orbital bodies is a printer.

7. A system, as in claim 1, wherein the emissions received are electromagnetic.

8. A system, as in claim 1, wherein the emissions received are optical.

9. A system for estimating the position, velocity and other parameters of each orbital body of a plurality of orbital bodies comprising:

means for receiving emissions from at least one orbital body;

means for computing an estimated position, velocity and other parameters for each orbital body of the plurality of orbital bodies, ground stations, and biases for multiple measurement types, simultaneously;

means for automatically resizing the maximum number of orbital bodies, when compiling a computer source code without the need for re-coding the computer source code;

means for adding new measurement types and state parameters to the computer source code; and means for displaying the estimated position, velocity, and other parameters of each orbital body of the plurality of orbital bodies, ground stations, and measurement types.

10. A system, as in claim 9, wherein the means for automatically resizing a problem when compiling a computer source code without the need for re-coding the computer source code is comprised of:

a set of parameters to set global limits on allowable numbers of orbital bodies, ground stations, measurement types, and parameters to estimate; and selection of an index array to form an overall system state and a collapsed state comprised of an estimate of parameters of collapsed covariance and collapsed state transition matrices.

11. A system, as in claim 9, wherein the means for adding new measurement types and state parameters is comprised of pointer arrays for orbital body sub-states, ground stations sub-states, and measurement bias sub-states.

12. A system, as in claim 9, wherein the means for computing an estimated position, velocity and other parameters for each orbital body of the plurality of orbital bodies, ground stations, and measurement types simultaneously is a computer.

13. A computer implemented process for estimating the position, velocity and other parameters of each orbital body of a plurality of orbital bodies comprising:

provide an initial condition file to store the orbital bodies position, velocity and other parameters;

provide a site-specific installation file for directory and naming of information for external files;

select of a processing mode of the system;

determine by a weighted least squares batch estimation process the bodies orbit through estimating the orbital bodies position, velocity and other parameters using electromagnetic and optical emissions of the orbital bodies and ground stations;

configure of process parameters using a set of key words found in a data base file and override files;

identify for each parameter a source from which to obtain the parameters value;

read an a priori initial condition file to obtain an initial guess of each orbital body's state vector and covariance;

read in an observation file;

analyze the observation file;

read in an estimation configuration file to determine which parameters are to be estimated or held fixed;

create a problem state and index array to collapse states and matrices;

set up pointer arrays to locate relevant information;

read in covariance override file to change any desired covariance terms recovered from the initial condition file;

process, sequentially, observations in the observation file;

configure process parameters using a set of key words found in a data base and the override files;

create a post priori initial condition file at the estimation time;

produce an ephemeris file;

configure process parameters using a set of key words found in data base and override files;

read in by a create initial file process initial orbital body states in terms of mean orbital elements, and osculating Cartesian coordinates; and create an a priori initial condition file compatible with the foregoing processes for orbit determination and prediction.

14. A process, as in claim 13, wherein the site-specific installation file for directory and naming of information for external files are comprised of database and override files, solar flux data files; leap second data file, and Earth orientation data file.

15. A process, as in claim 13, wherein the site-specific installation file for directory includes a data base file, override files, solar flux data file, leap second data file, and Earth orientation data file.

16. A process, as in claim 13, wherein the process parameter to be identified consists of an internal default, data base file, override file, initial condition file, and external file.

17. A process, as in claim 13, wherein the information read in and analyzed in the observation file is comprised of:

observations present, orbital bodies present, ground stations present; and number of tracking passes by the orbital body, ground station, and orbital body- ground station combination.

18. A process, as in claim 13, wherein the element of sequential processing of observations in the observation file is comprised of:

find a time and type of each measurement along with the orbital bodies and ground stations involved in making the measurement;

propagate the relevant orbital bodies to a time of measurement, starting with an initial guess of orbital body states;

predict what observation should be have been made using an appropriate measurement model;

determine type of bias to apply and correct theoretical measurement using pointer arrays;

compute the differential error between the observation and theoretical values;

accept or discard the difference measurement based on editing criteria defined by the data base file and override files;

compute sensitivity matrix of the initial condition to the error;

collapse the sensitivity matrix using index arrays;

update weighted least squares batch equations with the product of the sensitivity matrix and the error, continue for all observations in the observation file;

invert weighted least squares batch equations to obtain an improved estimate of the initial state;

update statistics of observation errors;

repeat the sensitivity computation over all states using an updated statistics of the observation errors;

repeat the update computation for the state, terminate this process when the magnitude of the update is less than a value defined in the data base files and override files;

produce a post priori initial condition file with improved estimate of initial orbital body states and their covariance;

produce an ephemeris file with start time, stop time, and granularity defined by the data base file and override;

produce a covariance file with start time, stop time, and granularity defined by the data base file and override;

produce detailed processing output file including a full configuration for the current problem, and for each iteration of the sensitivity computation, value of the state update, observation statistics by orbital body, station, and orbital body-station pair, and updated ending criteria; and create a measurement model bias report including the estimate value and covariance for every model bias estimated, and difference simulation biases containing common orbital body and ground stations.

19. A method for estimating the position, velocity, and other parameters of each orbital body of a plurality of orbital bodies comprising the steps:

receiving emissions from each orbital body of the plurality of orbital bodies;

computing an estimated position, velocity, and other parameters of each orbital body of the plurality of orbital bodies, simultaneously; and displaying the estimated position, velocity, and other parameters of each orbital body of the plurality of orbital bodies.

20. A computer implemented process which allows independent configuration of program elements comprising:

setting orbit determination and orbit prediction program parameters separately in a first database; and allowing program parameter values to be retrieved independently from default values, standard files, override files, and external sources from a second database.

21. A method for automatically resizing a problem at a beginning of execution of a computer implemented process without the need for re-coding a computer program comprising the steps of:

setting global limits on allowable numbers of ground stations, orbital bodies, measurement types, and parameters to estimate by the use of a set of parameters;

selecting an index array indicating which states are to be held fixed or estimated; and applying the index array to form an overall system state and a collapsed state consisting of the estimate parameters.

22. A method for estimating the position, velocity, and other parameters of each orbital body of a plurality of orbital bodies comprising the steps of:

receiving emissions from at least one orbital body;

computing an estimated position, velocity and other parameters for rich orbital body of the plurality of orbital bodies, ground stations, and measurement types, simultaneously;

resizing, automatically, a problem when compiling a computer source code without the need for re-coding the computer source code;

adding new measurement types and state parameters; and displaying the estimated position, velocity, and other parameters of each orbital body of the plurality of orbital bodies, ground stations, and measurement types.

23. A method for determining the position, velocity and other parameters of each orbital body of a plurality of orbital bodies comprising the steps of:

reading a site-specific installation file for directory and naming of information for external files;

selecting a processing mode of the system;

determining an orbital body's orbit by a weighted least squares batch estimation;

configuring process parameters using a set of key words found in a data base file and override files;

identifying for each parameter a source from which to obtain the parameter's value;

reading an initial condition file to obtain an initial, estimation of each orbital body of the plurality of orbital bodies state vector and covariance;

reading in an observation file;

analyzing the observation file;

reading in an estimation configuration file to determine which parameters are to be estimated or hold fixed;

creating a problem state and index array to collapse states and matrices;

setting up pointer arrays to locate relevant information;

reading in covariance override file to change any desired covariance terms recovered from the initial condition file;

processing, sequentially, observations in the observation file;

configuring process parameters using a set of key words found in a data base and the override files;

creating an initial condition file;

reading in the initial condition file to obtain an initial estimation of each orbital body of the plurality of orbital bodies state vectors and covariance;

producing an ephemeris file;

configuring process parameters using a set of key words found in data base and override files;

reading in initial orbital body state in terms of mean orbital elements, or osculating Cartesian coordinates; and creating an initial condition file compatible with the foregoing processes for orbit determination and prediction.

* * * * *